US012566534B2

(12) United States Patent
Shimizu et al.

(10) Patent No.: US 12,566,534 B2
(45) Date of Patent: Mar. 3, 2026

(54) INFORMATION PROCESSING APPARATUS, PROGRAM, AND INPUT SUPPORT METHOD

(71) Applicant: Resonac Corporation, Tokyo (JP)

(72) Inventors: Yohei Shimizu, Tokyo (JP); Yoshishige Okuno, Tokyo (JP)

(73) Assignee: Resonac Corporation, Tokyo (JP)

( * ) Notice: Subject to any disclaimer, the term of this patent is extended or adjusted under 35 U.S.C. 154(b) by 179 days.

(21) Appl. No.: 18/688,912

(22) PCT Filed: Oct. 12, 2022

(86) PCT No.: PCT/JP2022/037961
§ 371 (c)(1),
(2) Date: Mar. 4, 2024

(87) PCT Pub. No.: WO2023/063333
PCT Pub. Date: Apr. 20, 2023

(65) Prior Publication Data
US 2024/0370135 A1     Nov. 7, 2024

(30) Foreign Application Priority Data

Oct. 14, 2021     (JP) ................................. 2021-168567

(51) Int. Cl.
*G06F 3/0482*     (2013.01)
*G06F 3/04847*     (2022.01)
*G06F 3/0486*     (2013.01)

(52) U.S. Cl.
CPC ........ *G06F 3/0482* (2013.01); *G06F 3/04847* (2013.01); *G06F 3/0486* (2013.01)

(58) Field of Classification Search
CPC ................................................. G06F 3/048–05
See application file for complete search history.

(56) References Cited

U.S. PATENT DOCUMENTS

| | | | | |
|---|---|---|---|---|
| 9,058,627 | B1 * | 6/2015 | Wasser | G06F 3/0482 |
| 2005/0183012 | A1 * | 8/2005 | Petro | G06F 3/0482 |
| | | | | 715/713 |
| 2018/0130279 | A1 * | 5/2018 | Ceccaroli | G07F 13/065 |
| 2021/0193271 | A1 * | 6/2021 | Lelievre | C11B 9/00 |
| 2021/0397758 | A1 * | 12/2021 | Haeni | G06F 3/04883 |

FOREIGN PATENT DOCUMENTS

| | | |
|---|---|---|
| JP | 5605090 | 10/2014 |
| JP | 2019-086817 | 6/2019 |

* cited by examiner

*Primary Examiner* — Daniel Rodriguez
(74) *Attorney, Agent, or Firm* — IPUSA, PLLC

(57) ABSTRACT

An information processing apparatus for receiving input of information on a material composition from an operator includes a material reception unit configured to receive selection of a material, to which input of information is directed, in accordance with an operation specifying an on-screen position performed by the operator, and a material-content reception unit configured to receive selection of a content of the material, to which the input of information is directed, in accordance with an operation stopping specifying the on-screen position.

8 Claims, 14 Drawing Sheets

MATERIAL INFORMATION

| CATEGORY | MATERIAL | DETAILS | ··· |
|---|---|---|---|
| CATEGORY 1 | MATERIAL 1 | ··· | ··· |
| CATEGORY 1 | MATERIAL 2 | ··· | ··· |
| CATEGORY 1 | MATERIAL 3 | ··· | ··· |
| CATEGORY 1 | MATERIAL 4 | ··· | ··· |
| CATEGORY 1 | MATERIAL 5 | ··· | ··· |
| CATEGORY 1 | MATERIAL 6 | ··· | ··· |
| CATEGORY 1 | MATERIAL 7 | ··· | ··· |
| CATEGORY 1 | MATERIAL 8 | ··· | ··· |
| CATEGORY 2 | MATERIAL 11 | ··· | ··· |
| ··· | ··· | ··· | ··· |

FIG.5

MATERIAL-CONTENT INFORMATION

| MATERIAL | CONTENT SCALE MARKS (wt%) |
|---|---|
| MATERIAL 1 | 1,2,3,4,5,6,7,8,9,10,11,12,13,14,15,16 |
| MATERIAL 2 | 1,2,3,4,5,6,7,8,9,10,11,12,13,14,15,16 |
| MATERIAL 3 | 1,2,3,4,5,6,7,8,9,10,11,12,13,14,15,16 |
| MATERIAL 4 | 1,2,3,4,5,6,7,8,9,10,11,12,13,14,15,16 |
| MATERIAL 5 | 1,2,3,4,5,6,7,8,9,10,11,12,13,14,15,16 |
| MATERIAL 6 | 0.01,0.02,0.03,0.04,0.05,0.06,0.07,0.08, 0.09,0.10,0.11,0.12,0.13,0.14,0.15,0.16 |
| MATERIAL 7 | 0.01,0.02,0.03,0.04,0.05,0.06,0.07,0.08, 0.09,0.10,0.11,0.12,0.13,0.14,0.15,0.16 |
| MATERIAL 8 | 0.01,0.02,0.03,0.04,0.05,0.06,0.07,0.08, 0.09,0.10,0.11,0.12,0.13,0.14,0.15,0.16 |
| MATERIAL 11 | 0.01,0.02,0.03,0.04,0.05,0.06,0.07,0.08, 0.09,0.10,0.11,0.12,0.13,0.14,0.15,0.16 |
| ... | ... |

MATERIAL-CONTENT

MATERIAL-CONTENT

MATERIAL-CONTENT

FIG.10

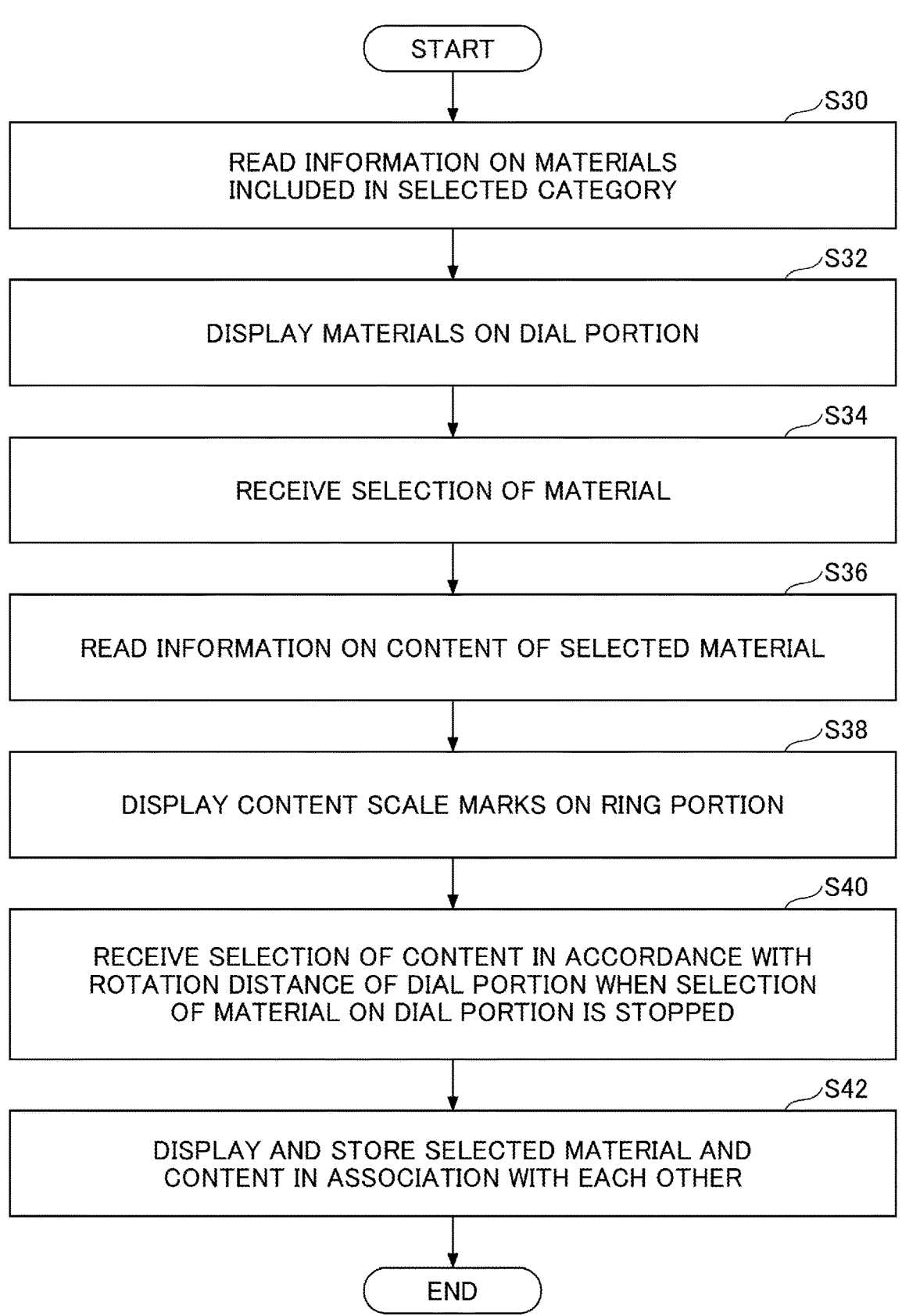

START

S30

READ INFORMATION ON MATERIALS
INCLUDED IN SELECTED CATEGORY

S32

DISPLAY MATERIALS ON DIAL PORTION

S34

RECEIVE SELECTION OF MATERIAL

S36

READ INFORMATION ON CONTENT OF SELECTED MATERIAL

S38

DISPLAY CONTENT SCALE MARKS ON RING PORTION

S40

RECEIVE SELECTION OF CONTENT IN ACCORDANCE WITH
ROTATION DISTANCE OF DIAL PORTION WHEN SELECTION
OF MATERIAL ON DIAL PORTION IS STOPPED

S42

DISPLAY AND STORE SELECTED MATERIAL AND
CONTENT IN ASSOCIATION WITH EACH OTHER

END

INFORMATION PROCESSING APPARATUS, PROGRAM, AND INPUT SUPPORT METHOD

TECHNICAL FIELD

The present disclosure relates to an information processing apparatus, a program, and an input support method.

BACKGROUND ART

In recent years, composite materials have been designed with the use of a computer in order to reduce human workload and worktime. For example, Patent Document 1 discloses a technique of simulating characteristics of a substance newly generated by combining multiple types of substances, linking information on the substances to be combined and information on the simulation result of the characteristics of the newly generated substance, and extracting specific information according to search criteria input by a user.

RELATED ART DOCUMENT

Patent Document

Patent Document 1: Japanese Patent No. 5605090

DISCLOSURE OF THE INVENTION

Problem to be Solved by the Invention

In the design of a composite material using a computer, it is necessary to input all information on material compositions (explanatory variables) including material types and material contents as mixture information for predicting the physical properties (target variables) of the composite material. If the time for inputting the information on the material composition is shortened, an operator is able to quickly obtain the prediction result of the physical properties of the composite material.

The present disclosure provides an information processing apparatus, a program, and an input support method that support to shorten a time required for inputting information on a material composition.

Means for Solving the Problem

The present disclosure includes the following configurations.

[1] An information processing apparatus for receiving input of information on a material composition from an operator includes:

a material reception unit configured to receive selection of a material, to which input of information is directed, in accordance with an operation specifying an on-screen position performed by the operator; and a material-content reception unit configured to receive selection of a content of the material, to which the input of information is directed, in accordance with an operation stopping specifying the on-screen position.

[2] The information processing apparatus as recited in [1] further includes:

a material display control unit configured to display information on materials associated with respective on-screen positions on a screen such that the selection of the material, to which the input of information is directed, is received from the operator in accordance with the operation specifying the on-screen position; and a material-content display control unit configured to display information on material contents associated with respective on-screen positions on the screen such that the selection of the content of the material is received from the operator in accordance with the operation stopping specifying the on-screen position.

[3] The information processing apparatus as recited in [2] further includes:

a category selection reception unit configured to receive selection of a category of the materials, wherein the material display control unit is configured to switch the information on the materials to be displayed on the screen in accordance with the category selected by the operator.

[4] In the information processing apparatus as recited in [2] or [3], wherein the material-content display control unit is configured to switch the information on the material contents selected by the operator, in accordance with the material, to which the input of information is directed, selected by the operator.

[5] In the information processing apparatus as recited in any one of [2] to [4], wherein the material display control unit is configured to display the information on the materials, to which the input of information is directed, arranged in a circumferential direction on a dial portion that rotates in accordance with an operation by the operator, the material reception unit is configured to receive the selection of the material, to which the input of information is directed, in accordance with the operation specifying the on-screen position performed by the operator on the dial portion, the material-content display control unit is configured to display the information on the material contents such that the information on the material contents are arranged in a circumferential direction on a ring portion displayed outside the dial portion, and the material-content reception unit is configured to receive the selection of the content of the material, to which the input of information is directed, by the operation stopping specifying the on-screen position, based on a positional relationship between a position where the information on the material, to which the input of information is directed, is displayed on the dial portion and a position where the information on the material contents is displayed on the ring portion, the positional relationship being changed in accordance with a rotation distance of the dial portion in the circumferential direction.

[6] In the information processing apparatus as recited in any one of [1] to [5], wherein the operation specifying the on-screen position performed by the operator is a starting operation of dragging by the operator, and the operation stopping specifying the on-screen position is an ending operation of the dragging.

[7] A program for causing a computer for receiving input of information on a material composition from an operator to function as:

a material reception unit configured to receive selection of a material, to which input of information is directed, in accordance with an operation specifying an on-screen position performed by the operator; and a material-content reception unit configured to receive selection of a content of the material, to which the input of information is directed, in accordance with an operation stopping specifying the on-screen position.

[8] An input support method executed by a computer for receiving input of information on a material composition from an operator includes:

receiving selection of a material, to which input of information is directed, in accordance with an operation specifying an on-screen position performed by the operator; and receiving selection of a content of the material, to which the input of information is directed, in accordance with an operation stopping specifying the on-screen position.

Effect of the Invention

According to the present disclosure, it is possible to support to shorten a time required for inputting information on a material composition.

BRIEF DESCRIPTION OF THE DRAWINGS

FIG. 2 is hardware configuration diagram illustrating an example of a computer according to the present embodiment.

FIG. 4 is a diagram illustrating an example of material information.

FIG. 5 is a diagram illustrating an example of material-content information.

FIG. 10 is a flowchart illustrating an example of a processing procedure of the information processing system according to the present embodiment.

MODE OF CARRYING OUT THE INVENTION

Embodiments of the present disclosure will be described in detail. The present disclosure is not limited to the following embodiments. In a present embodiment, materials classified into categories will be described as an example. The categories include, for example, in a case of a resin composite material, a resin, a filler, a catalyst, a polymerization initiator, a polymerization inhibitor, a crosslinking agent, and a curing agent. The filler, the catalyst, the polymerization initiator, the polymerization inhibitor, the crosslinking agent, and the curing agent are examples of the additive.

Embodiments

System Configuration

Figure 1:
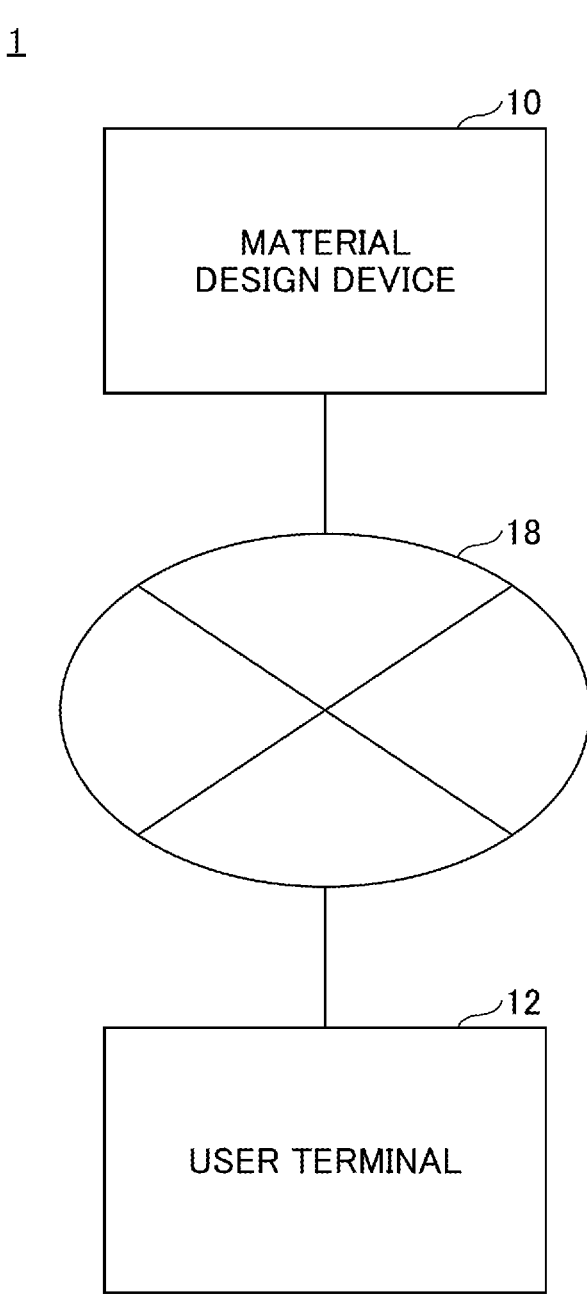
FIG. 1 is a configuration diagram illustrating an example of an information processing system according to a present embodiment.

FIG. 1 is a configuration diagram of an example of an information processing system according to the present embodiment. An information processing system 1 of FIG. 1 includes a material design device 10 and a user terminal 12. The material design device 10 and the user terminal 12 are connected to each other via a communication network 18 such as a local area network (LAN) or the Internet so as to enable data transmission.

The user terminal 12 is an information processing apparatus such as a PC, a tablet terminal, or a smartphone operated by an operator. The user terminal 12 receives input of information on a material composition necessary for designing a composite material from the operator. The user terminal 12 then transmits the information on the material composition received from the operator to the material design device 10. Furthermore, the user terminal 12 receives information such as physical properties of the composite material predicted from the information on the material composition by the material design device 10, and displays the information on a display device or the like to allow a user to confirm the information.

The material design device 10 is an information processing apparatus such as a PC or a workstation that executes a process of predicting information such as physical properties of a composite material from information on a material composition. The material design device 10 predicts the physical properties (target variables) of the composite material from the information on the material composition (explanatory variables) including material types and material contents using a prediction model on which machine learning has been performed, for example. The material design device 10 then transmits information such as the predicted physical properties of the composite material to the user terminal 12.

The information processing system 1 according to the present embodiment provides a user interface (hereinafter referred to as a UI), described below, that supports input of information on a material composition by an operator, thereby reducing a time required for the operator to input the information on the material composition.

Note that the information processing system 1 of FIG. 1 is an example, and it is needless to say that various system configuration examples are available according to the use and purpose. For example, the material design device 10 may be achieved by computers or may be achieved as a cloud computing service. The information processing system 1 of FIG. 1 may be implemented by a stand-alone computer.

Hardware Configuration

Figure 2:
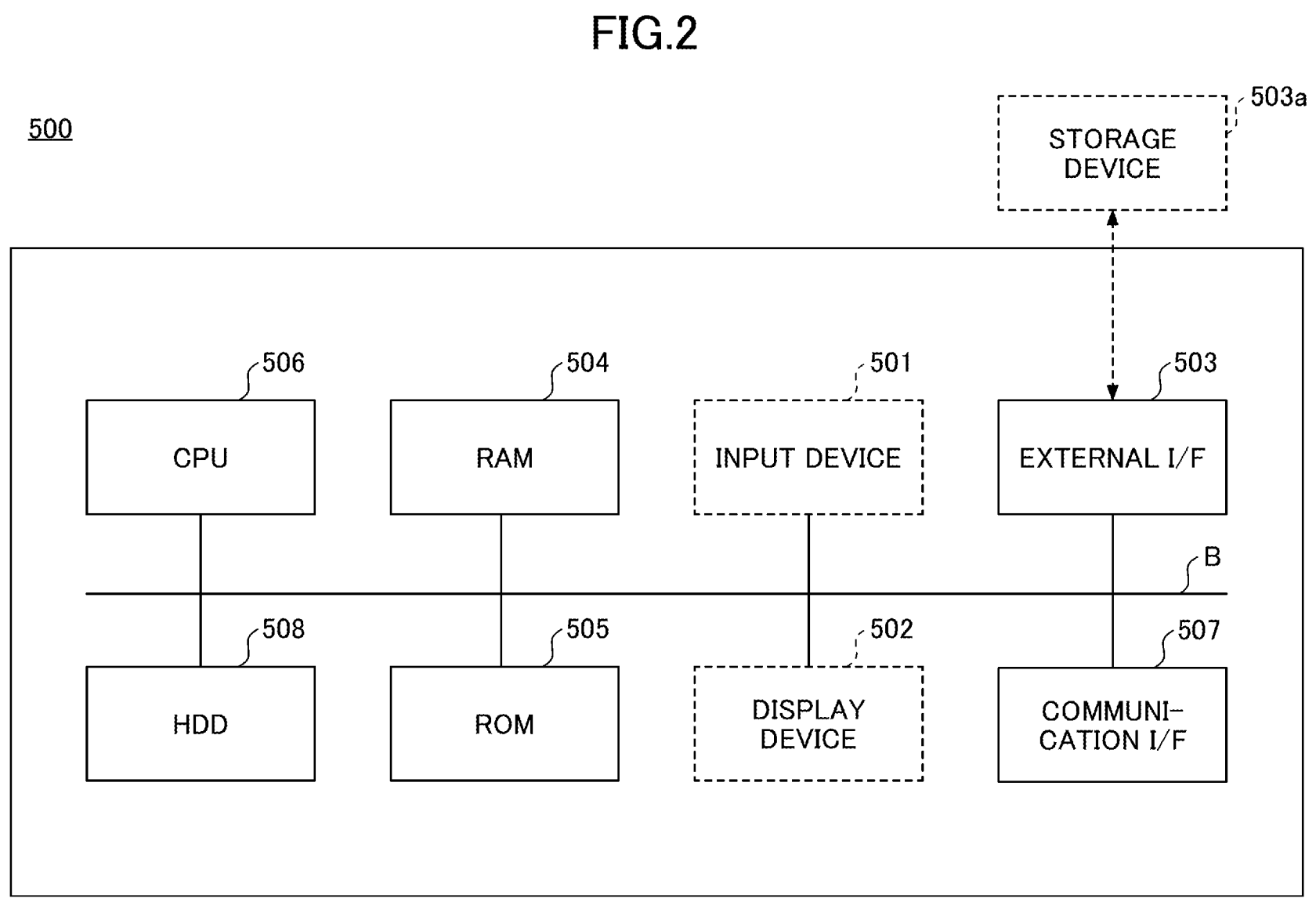

The material design device 10 and the user terminal 12 of FIG. 1 are achieved by a computer 500 having a hardware configuration illustrated in FIG. 2, for example.

FIG. 2 is a hardware configuration diagram of an example of the computer according to the present embodiment. The computer 500 in FIG. 2 includes an input device 501, a display device 502, an external I/F 503, a RAM 504, a ROM 505, a CPU 506, a communication I/F 507, an HDD 508, and the like, which are connected to each other via a bus B. Note that the input device 501 and the display device 502 may be directly connected to each other.

The input device 501 is a touch panel, operation keys, buttons, a keyboard, a mouse, or the like used by an operator to input various signals. The display device 502 is configured with a display such as a liquid crystal display or an organic EL display that displays a screen, a speaker that outputs sound data such as voice or sound, and the like. The communication I/F 507 is an interface for the computer 500 to perform data transmission.

The HDD 508 is an example of a non-volatile storage device that stores programs and data. The stored programs and data include an OS which is basic software for controlling the computer 500, and applications for providing various functions on the OS. The computer 500 may use, instead of the HDD 508, a drive device (for example, a solid state drive (SSD)) using a flash memory as a storage medium.

The external I/F 503 is an interface with an external device. The external device includes a recording medium 503a. The computer 500 can read data from the recording medium 503a, write data thereto, or both through the external I/F 503. The recording medium 503a may be a flexible disk, a CD, a DVD, a SD memory card, a USB-memory, or the like.

The ROM 505 is an example of a non-volatile memory (storage device) that can retain programs and data even when the power is turned off. The ROM 505 stores programs and data such as a BIOS, OS settings, and network settings to be executed when the computer 500 is activated. The RAM 504 is an example of a volatile memory (storage device) that temporarily stores programs and data.

The CPU 506 is an arithmetic device that loads the programs and the data in the storage device such as the ROM 505 or the HDD 508 onto the RAM 504 to execute processing for achieving control and functions of the computer 500. The computer 500 according to the present embodiment can achieve various functions of the material design device 10 and the user terminal 12 as described below by executing the program. The CPU 506 may load, via the external I/F 503, a program in the recording medium 503a in which programs are stored to execute the program.

Functional Configuration

Figure 3:
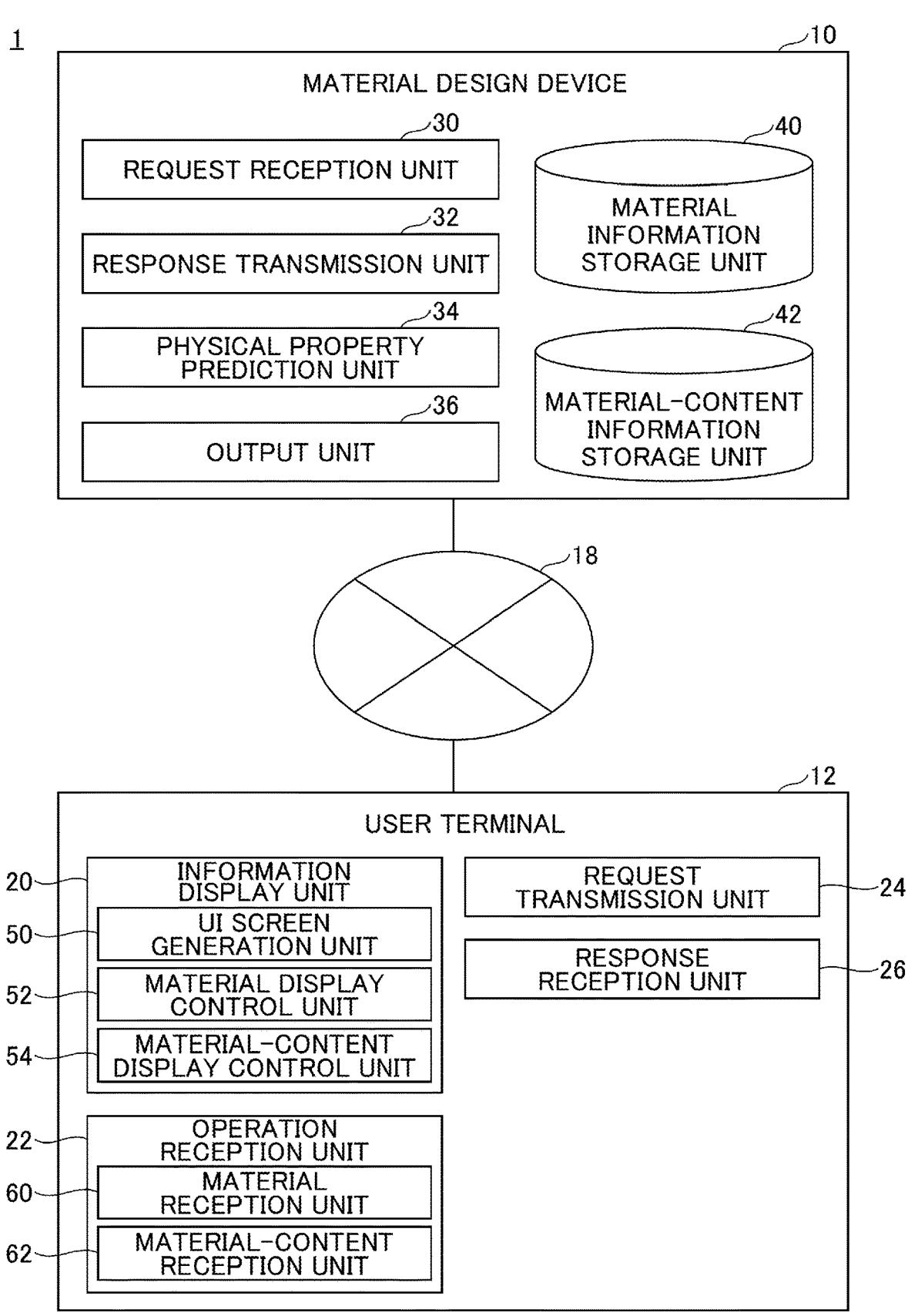
FIG. 3 is a functional configuration diagram illustrating an example of the information processing system according to the present embodiment.

A configuration of the information processing system 1 according to the present embodiment will be described. FIG. 3 is a functional configuration diagram of an example of the information processing system according to the present embodiment. In the configuration diagram of FIG. 3, parts unnecessary for the description of the present embodiment are omitted as appropriate.

The material design device 10 of the information processing system 1 illustrated in FIG. 3 includes a request reception unit 30, a response transmission unit 32, a physical property prediction unit 34, an output unit 36, a material information storage unit 40, and a material-content information storage unit 42. The user terminal 12 includes an information display unit 20, an operation reception unit 22, a request transmission unit 24, and a response reception unit 26. The information display unit 20 includes a UI screen generation unit 50, a material display control unit 52, and a material-content display control unit 54. The operation reception unit 22 includes a material reception unit 60 and a material-content reception unit 62.

The information display unit 20 of the user terminal 12 displays a UI screen that supports input of information on a material composition by the operator on the display device 502. The UI screen generation unit 50 of the information display unit 20 generates the UI screen described below to display the screen on the display device 502. The material display control unit 52 displays information (material names and the like) of materials which can be selected by the operator as a material to which input of information is directed on the UI screen described below. The material display control unit 52 also switches the information of materials to be displayed on the UI screen described below in accordance with selection of category received from the operator. The material-content display control unit 54 displays contents for a material which can be selected by the operator on the UI screen described below. For example, the contents for a material that can be selected by the operator are displayed in a unit suitable for the material, to which the input of information is directed, selected by the operator.

The operation reception unit 22 receives various operations such as input of information on a material composition necessary for designing a composite material from the operator. The material reception unit 60 receives selection of a material, to which the input of information is directed, from the operator in accordance with an operation specifying an on-screen position performed by the operator on the UI screen described below. For example, in a case where an operator uses a touch panel, the operation specifying the on-screen position performed by the operator is a starting operation of dragging an object on the touch panel by the operator while maintaining touching motion performed thereto. In a case where an operator uses a pointing device such as a mouse, for example, the operation specifying the on-screen position performed by the operator is a starting operation of dragging an object on the screen with the pointing device by the operator while maintaining clicking motion to the object with the pointing device (for example, holding a click button down). Once the dragging is started, the operator moves the position of the object being touched or the position of the object being pointed with the pointing device while maintaining a state of the dragging.

The material-content reception unit 62 receives a content of the material, to which the input of information is directed, from the operator in accordance with an operation stopping specifying the on-screen position performed by the operator on the UI screen described below. In the case where the operator uses the touch panel, for example, the operation stopping specifying the on-screen position performed by the operator is an ending operation of the dragging by stopping the touching motion (for example, by releasing the operator's finger from the touch panel) by the operator. In the case where the operator uses the pointing device such as a mouse, for example, the operation stopping specifying the on-screen position performed by the operator is an ending operation of the dragging by stopping the click operation (for example, by releasing the click button from being held down) by the operator.

The request transmission unit 24 transmits a request such as processing of predicting physical properties of the composite material from the information on the material composition to the material design device 10. The response reception unit 26 receives a response to the request transmitted by the request transmission unit 24 from the material design device 10.

The request reception unit 30 of the material design device 10 receives the request such as processing of predicting the physical properties of the composite material from the information on the material composition from the user terminal 12. The response transmission unit 32 transmits a response to the request received by the request reception unit 30 to the user terminal 12. The physical property prediction unit 34 predicts the physical properties of the composite material from the information of the material composition including the material types and the material contents using, for example, the prediction model on which machine learning has been performed. The output unit 36 outputs, for example, information on the physical properties of the composite material predicted by the physical property prediction unit 34 in response to the request from the user terminal 12.

The material information storage unit 40 stores material information on materials which can be selected by the operator from the UI screen described below. The material information stored in the material information storage unit 40 has, for example, a configuration illustrated in FIG. 4. FIG. 4 is a diagram illustrating an example of the material information. The material information in FIG. 4 is information in which items such as "Category", "Material", and "Details" are associated with each other.

The item "Category" includes information for classifying a material, for example. The item "Material" includes identification information on the material that can be selected by the operator from the UI screen described below, and is, for example, a material name. The item "Details" includes various kinds of information on the material necessary for predicting information such as the characteristics of the composite material from the information on the material composition. The material information in FIG. 4 is an example in which materials to be selected by the operator from the UI screen described below are classified into the categories.

The material-content information storage unit 42 stores information on a content suitable for the material as an example of information for displaying scale marks indicating contents for the material on the UI screen described below. The material-content information stored in the material-content information storage unit 42 has, for example, a configuration illustrated in FIG. 5. The material-content information in FIG. 5 is information in which items such as "Material" and "Content scale marks" are associated with each other.

The item "Material" includes identification information on a material, and is, for example, a material name. The item "Content scale marks" indicates a content suitable for the material, and is used to display the scale marks indicating contents for the material on the UI screen described below. The contents suitable for each material may be set with reference to, for example, a material composition of a known composite material, or may be set for each category.

Note that the configuration diagram of FIG. 3 is an example. Various configurations of the information processing system 1 according to the present embodiment can be considered. For example, at least a part of the functions of the material design device 10 may be provided as a part of the functions of the user terminal 12. At least a part of the functions of the user terminal 12 may be provided as a part of the functions of the material design device 10. Furthermore, for example, both of the material information storage unit 40 and the material-content information storage unit 42 of the material design device 10 may be provided in the user terminal 12, or may be provided in an information processing apparatus other than the material design device 10 and the user terminal 12.

Figure 6:
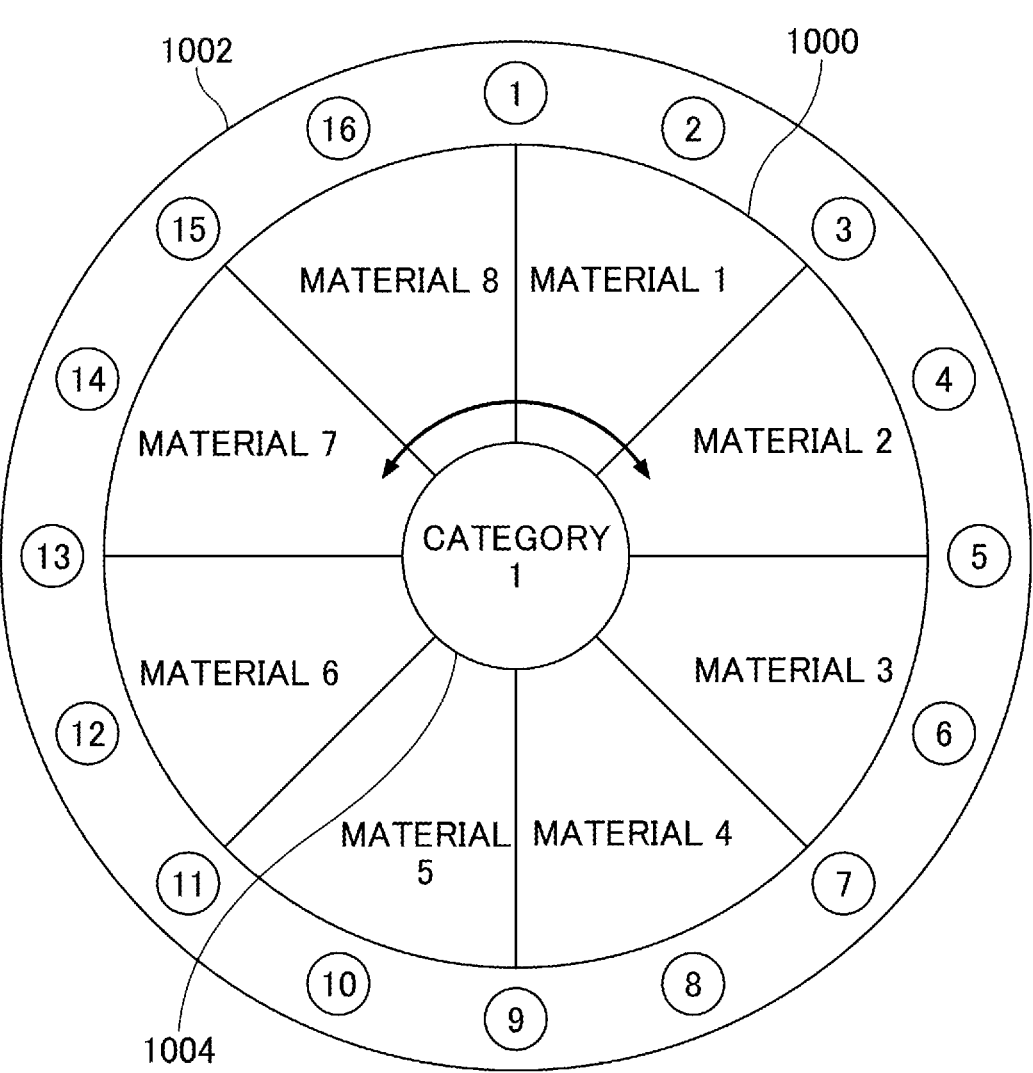
FIG. 6 is an illustration of an example of a UI that supports input of information on a material composition.

Study of UI That Supports Input of Information on Material Composition by Operator FIG. 6 is an illustration of an example of the UI that supports input of information on a material composition. The UI in FIG. 6 includes a dial portion 1000, a ring portion 1002, and a category selection reception unit 1004. The dial portion 1000 of FIG. 6 is circular and is divided into the number of selectable materials through central angles of the circle. Note that the dial portion 1000 may be divided equally or may not be divided equally. For example, in the dial portion 1000 of FIG. 6, the number of selectable materials is "8", and "Material 1" to "Material 8" are allocated to the respective equally divided regions. The number of divided regions of the dial portion 1000 may be a variable which depends on the number of selectable materials under a condition that an upper limit of the number of regions is set. The number of divided regions of the dial portion 1000 may be fixed. The dial portion 1000 of FIG. 6 is an example in which the material names are arranged in the circumferential direction on the respective divided regions of the dial portion 1000.

The material names arranged in the circumferential direction on the respective divided regions of the dial portion 1000 are switched by the operation of the operator to the category selection reception unit 1004. For example, the operator can switch the category by clicking the category selection reception unit 1004 to select a desired category.

The operator selects a material, to which input of information is directed, by starting a drag operation described below to the dial portion 1000, rotates the dial portion 1000 by performing the drag operation, and selects a content of the material to which the input of information is directed by ending the drag operation described below.

The ring portion 1002 is displayed outside the dial portion 1000. The scale marks indicating the contents for the material, to which the input of information is directed, are arranged in the circumferential direction on the ring portion 1002. As illustrated in the material-content information in FIG. 5, the scale marks indicating the contents arranged on the ring portion 1002 can be switched according to the material to which the input of information is directed so that the contents suitable for the material is displayed.

Figure 7A:
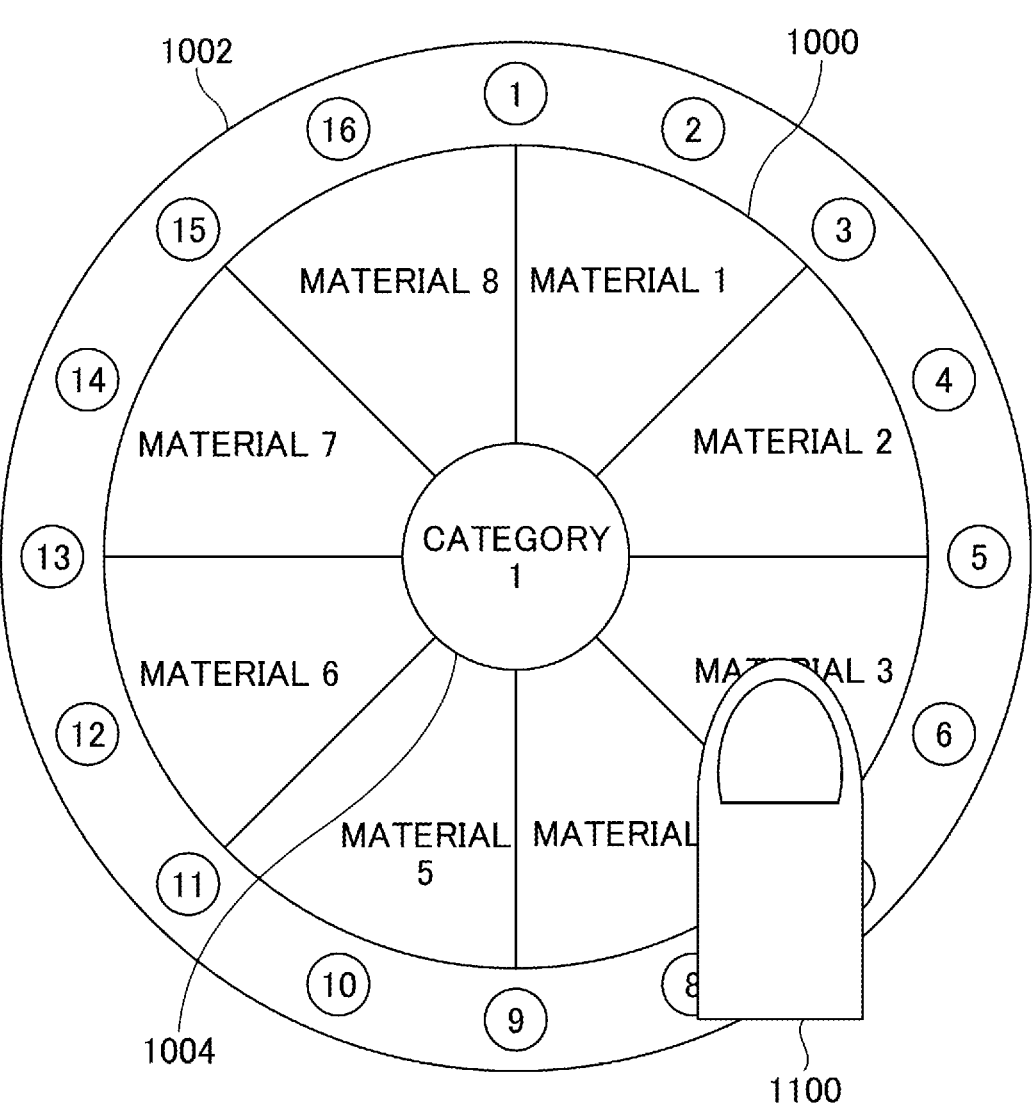
FIG. 7A is an illustration of an example of a starting operation of dragging on a dial portion by an operator.
Figure 7B:
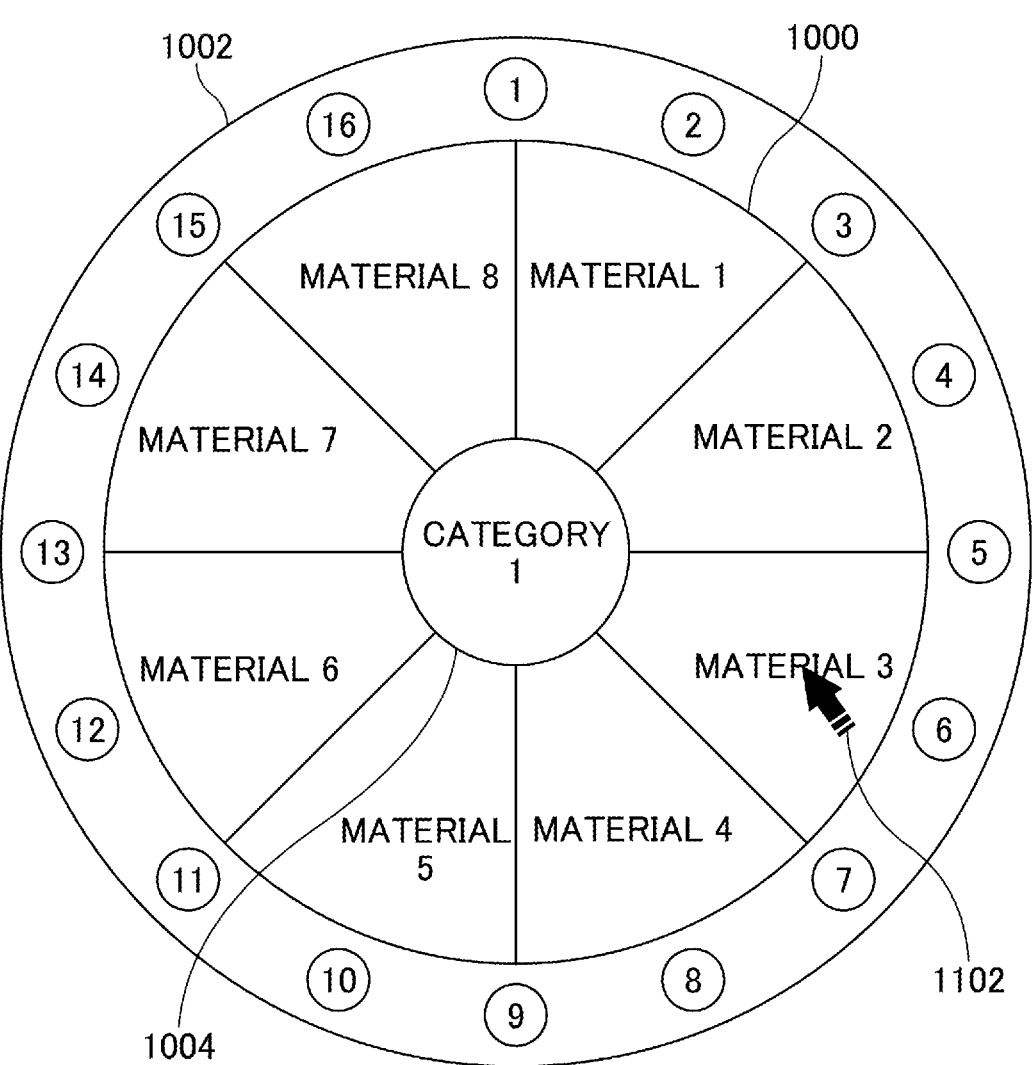
FIG. 7B is an illustration of the example of the starting operation of dragging on the dial portion by an operator.

FIG. 7A and FIG. 7B are illustrations of an example of a starting operation of dragging on the dial portion by the operator. The operator performs the operation specifying the on-screen position as illustrated in FIG. 7A or FIG. 7B on a divided region on which the name of the material to which input of information is directed is arranged among the material names arranged on the dial portion 1000.

FIG. 7A is an illustration of an example of using a touch panel. In a case of FIG. 7A, the operator performs the touching motion with a finger 1100 or the like on a region on which "Material 3" which is the name of the material to which the input of information is directed is arranged, and maintains a touched state, thereby making it possible to make a state in which the material to which the input of information is directed is being selected.

FIG. 7B is an illustration of an example of using a pointing device such as a mouse. In a case of FIG. 7B, the operator moves a pointer 1102 to the region on which "Material 3" which is the name of the material to which the input of information is directed is arranged. The operator then performs the click operation, and maintains a clicked state (for example, holding the click button down), thereby making it possible to make a state in which the material to which the input of information is directed is being selected.

Figure 8A:
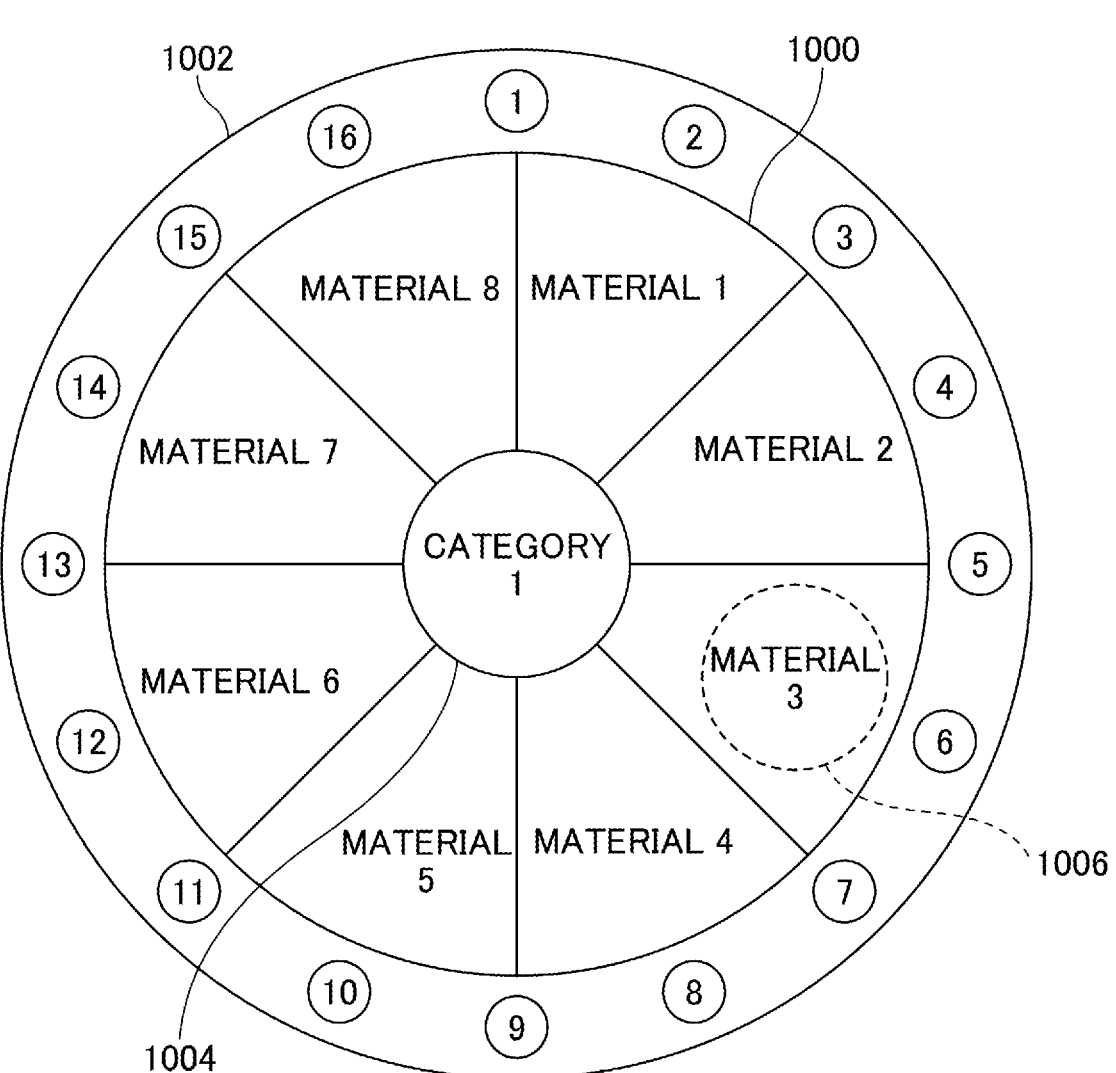
FIG. 8A is a diagram for describing an example of an operation by an operator who selects a content "16" of a "Material 3" with use of the UI that supports the input of information on a material composition.
Figure 8B:
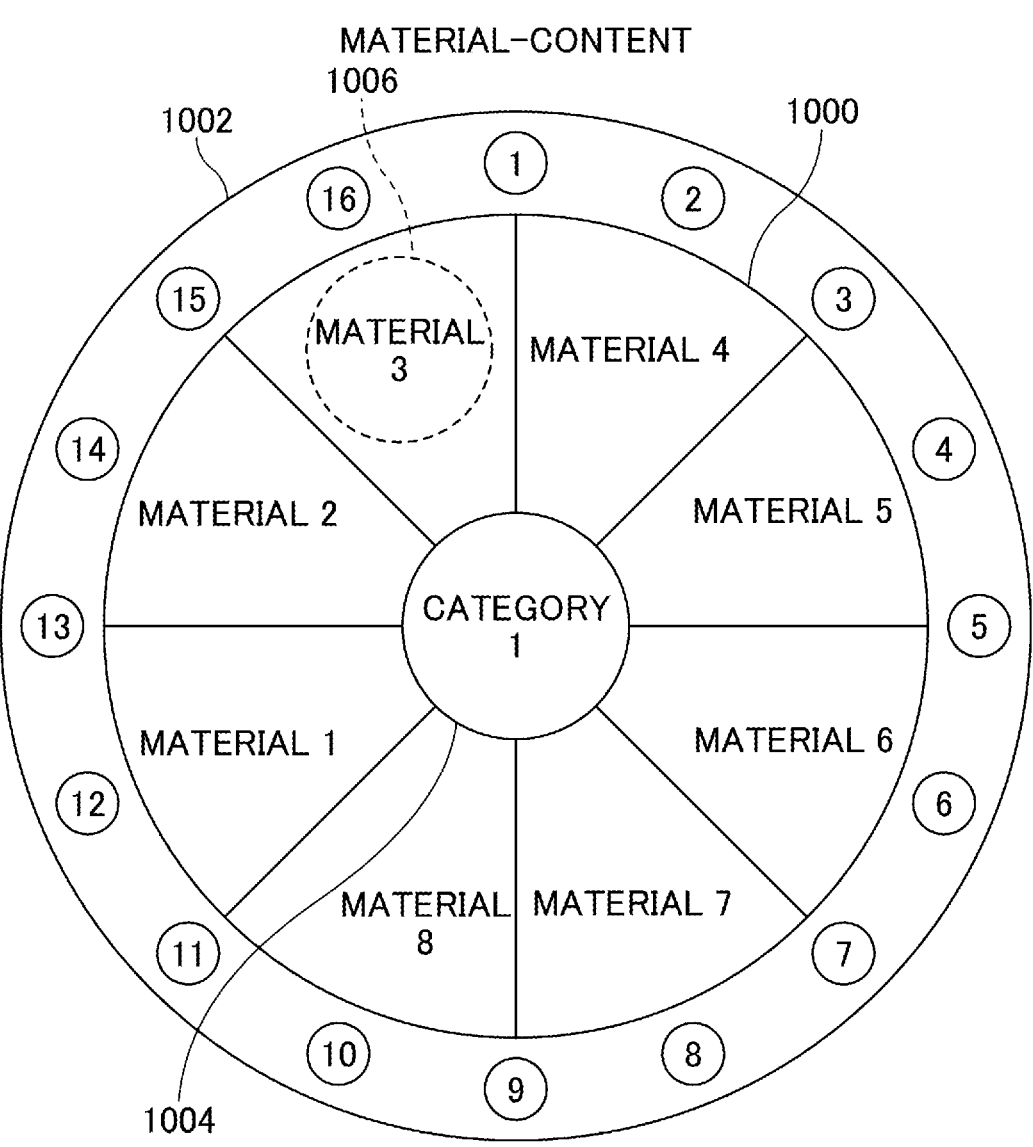
FIG. 8B is a diagram for describing an example of an operation by an operator who selects the content "16" of "Material 3" with the use of the UI that supports the input of information on a material composition.

FIG. 8A and FIG. 8B are explanatory diagrams illustrating an example of an operation by the operator who selects a content "16" of "Material 3" with the use of the UI that supports the input of information on a material composition. FIG. 8A is an illustration of an example of the state in which the material name "Material 3" which is the name of the material to which the input of information is directed is selected by the operation specifying the on-screen position illustrated in FIG. 7A and FIG. 7B. A selected region 1006 on which "Material 3" which is the name of the material to which the input of information is directed is displayed may be visually changed by being highlighted or the like. The operator can rotate the dial portion 1000 by performing the drag operation in the state where the region on which "Material 3" which is the name of the material to which the input of information is directed is displayed is being selected.

The operator performs the operation stopping specifying the on-screen position after rotating the dial portion 1000 by performing the drag operation in the state where the region, on which the name of the material to which the input of information is directed is arranged, is being selected. Accordingly, the operator can select the content of the material to which the input of information is directed based on a positional relationship between the position where the name of the material to which the input of information is directed is displayed on the dial portion 1000 and the position where the scale mark of the content is displayed on the ring portion 1002.

For example, the operator can select the content "16" of "Material 3" by firstly performing the drag operation in the state where the region, on which the name of the material to which the input of information is directed is arranged, is being selected to rotate the dial portion 1000 from the state illustrated in FIG. 8A to the state illustrated in FIG. 8B, and then performing the operation stopping specifying the on-screen position.

For example, in the case where the touch panel is used, the operator performs the touching motion on the region 1006 on which "Material 3" is displayed as illustrated in FIG. 8A, and, while maintaining the touched state, rotates the dial portion 1000 by performing the drag operation such that the dial portion becomes in the state illustrated in FIG. 8B. FIG. 8B illustrates an example in which the dial portion 1000 is rotated so that the region 1006 on which "Material 3" is displayed on the dial portion 1000 approaches the position of the scale mark indicating the content "16" on the ring portion 1002. Accordingly, the operator can select the content of "Material 3" to be the content of "16" by releasing the finger touching the region 1006 from the touch panel in the state of FIG. 8B.

Furthermore, in the case where the pointing device such as a mouse is used, the operator performs the click operation on the region 1006 on which "Material 3" is displayed as illustrated in FIG. 8A, and, while maintaining the clicked state, rotates the dial portion 1000 by performing the drag operation such that the dial portion becomes in the state illustrated in FIG. 8B. Accordingly, the operator can select the content of "Material 3" to be the content of "16" by stopping the long press of the button in the state of FIG. 8B.

By using the UI illustrated in FIG. 6, FIG. 7A, FIG. 7B, FIG. 8A, and FIG. 8B, the operator can select a material to which input of information is directed and a content of the material to which the input of information is directed by one drag operation. For example, the UI illustrated in FIG. 6 can suppress an increase in the number of taps or clicks and an increase in the movement distance of the finger or the pointing device on the screen, compared to a case where selection of a material to which input of information is directed and selection of a content of the material to which the input of information is directed are performed using pull-down menus or the like.

Processing

Hereinafter, processing in which the information processing system 1 according to the present embodiment receives input of information on a material composition from an operator will be described.

Figure 9:
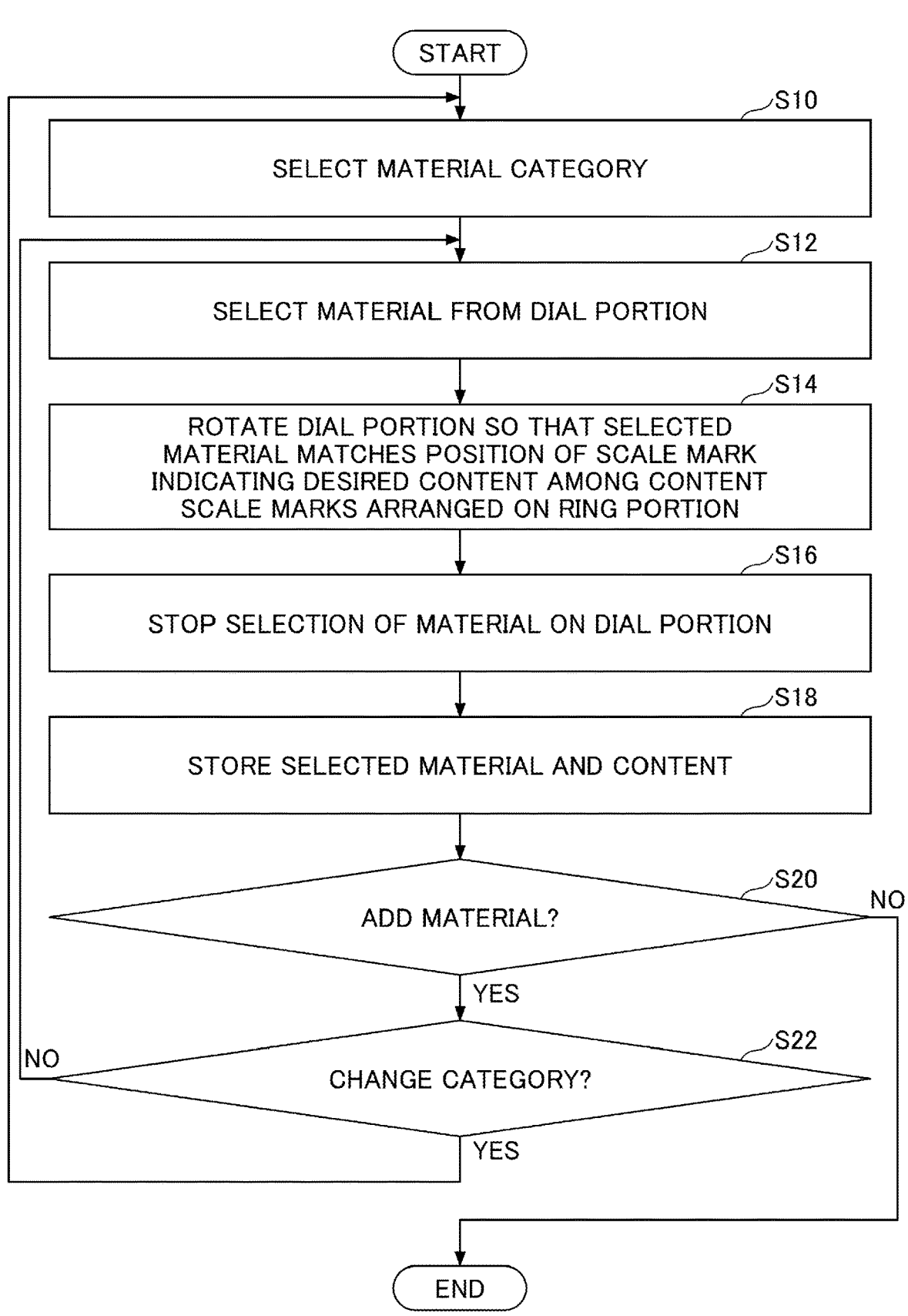
FIG. 9 is a flowchart illustrating an example of an input support method for the information processing system according to the present embodiment.

FIG. 9 is a flowchart of an example of an input support method for the information processing system according to the present embodiment. In step S10, the user terminal 12 receives selection of a category of materials from the operator who operates the category selection reception unit 1004 of the UI illustrated in FIG. 6, FIG. 7A, FIG. 7B, FIG. 8A, and FIG. 8B. The user terminal 12 displays names of the materials of the selected category on the dial portion 1000 of the UI illustrated in FIG. 6, FIG. 7A, FIG. 7B, FIG. 8A, and FIG. 8B.

In step S12, the user terminal 12 receives selection of a material from the operator performing the operation specifying the on-screen position on the dial portion 1000 of the UI illustrated in FIG. 6, FIG. 7A, FIG. 7B, FIG. 8A, and FIG. 8B. In step S14, the operator rotates the dial portion 1000 so that the region 1006 on which the name of the selected material is displayed on the dial portion 1000 matches (approaches) a position of a scale mark indicating a desired content among the scale marks each indicating the content of the material arranged on the ring portion 1002. The user terminal 12 determines a rotation distance of the dial portion 1000 rotated by the operator.

In step S16, the user terminal 12 receives stopping of the selection of the material from the operator performing the operation stopping specifying the on-screen position on the dial portion 1000 of the UI illustrated in FIG. 6, FIG. 7A, FIG. 7B, FIG. 8A, and FIG. 8B. In step S18, the user terminal 12 receives selection of the content of the selected material, to which input of information is directed, based on the positional relationship between the position where the name of the material to which the input of information is directed is displayed on the dial portion 1000 and the position where the scale mark of the content is displayed on the ring portion 1002. The positional relationship is changed in accordance with the rotation distance of the dial portion 1000. The user terminal 12 then stores the selected material and the content of the material in association with each other. In step S20, if there is a material to be added, the operator performs an operation of adding the material. If there is no material to be added in step S20, the operator ends the processing of the flowchart of FIG. 9.

In accordance with the operation to add a material from the operator, the user terminal 12 performs the process of step S22. In step S22, in accordance with an operation to change the category from the operator, the user terminal 12 returns to step S10 to continue the process. If the user terminal 12 does not receive the operation to change the category from the operator in step S22, the user terminal 12 returns to step S12 to continue the process. If the user terminal 12 does not receive the operation to add a material from the operator, the user terminal 12 ends the processing of the flowchart of FIG. 9.

FIG. 10 is a flowchart illustrating an example of a processing procedure of the information processing system according to the present embodiment. The flowchart of FIG. 10 is for explaining the processes of steps S10 to S18 of FIG. 9 in more detail.

In step S30, the user terminal 12 requests the material design device 10 to read the information on the materials of the category selected by the operator, thereby reading the material information of the selected category from the material information storage unit 40. In step S32, the user terminal 12 displays the names of the materials of the category selected by the operator on the dial portion 1000 of the UI illustrated in FIG. 6, FIG. 7A, FIG. 7B, FIG. 8A, and FIG. 8B.

In step S34, the user terminal 12 receives selection of a material from the operator performing the operation specifying the on-screen position on the dial portion 1000 of the UI illustrated in FIG. 6, FIG. 7A, FIG. 7B, FIG. 8A, and FIG. 8B. In step S36, the user terminal 12 requests the material design device 10 to read the information on the content of the material selected by the operator, thereby reading the information on the content of the material selected from the material-content information storage unit 42.

In step S38, the user terminal 12 displays the scale marks for the contents for the selected material so as to be arranged in the circumferential direction on the ring portion 1002 of the UI illustrated in FIG. 6, FIG. 7A, FIG. 7B, FIG. 8A, and FIG. 8B. In step S40, the user terminal 12 receives selection of the content of the selected material in accordance with the rotation distance of the dial portion 1000 upon reception of stopping of the selection of the material from the operator performing the operation stopping specifying the on-screen position on the dial portion 1000 of the UI illustrated in FIG. 6, FIG. 7A, FIG. 7B, FIG. 8A, and FIG. 8B.

In step S42, the user terminal 12 displays and stores the selected material and the content of the material in association with each other.

Figure 11:
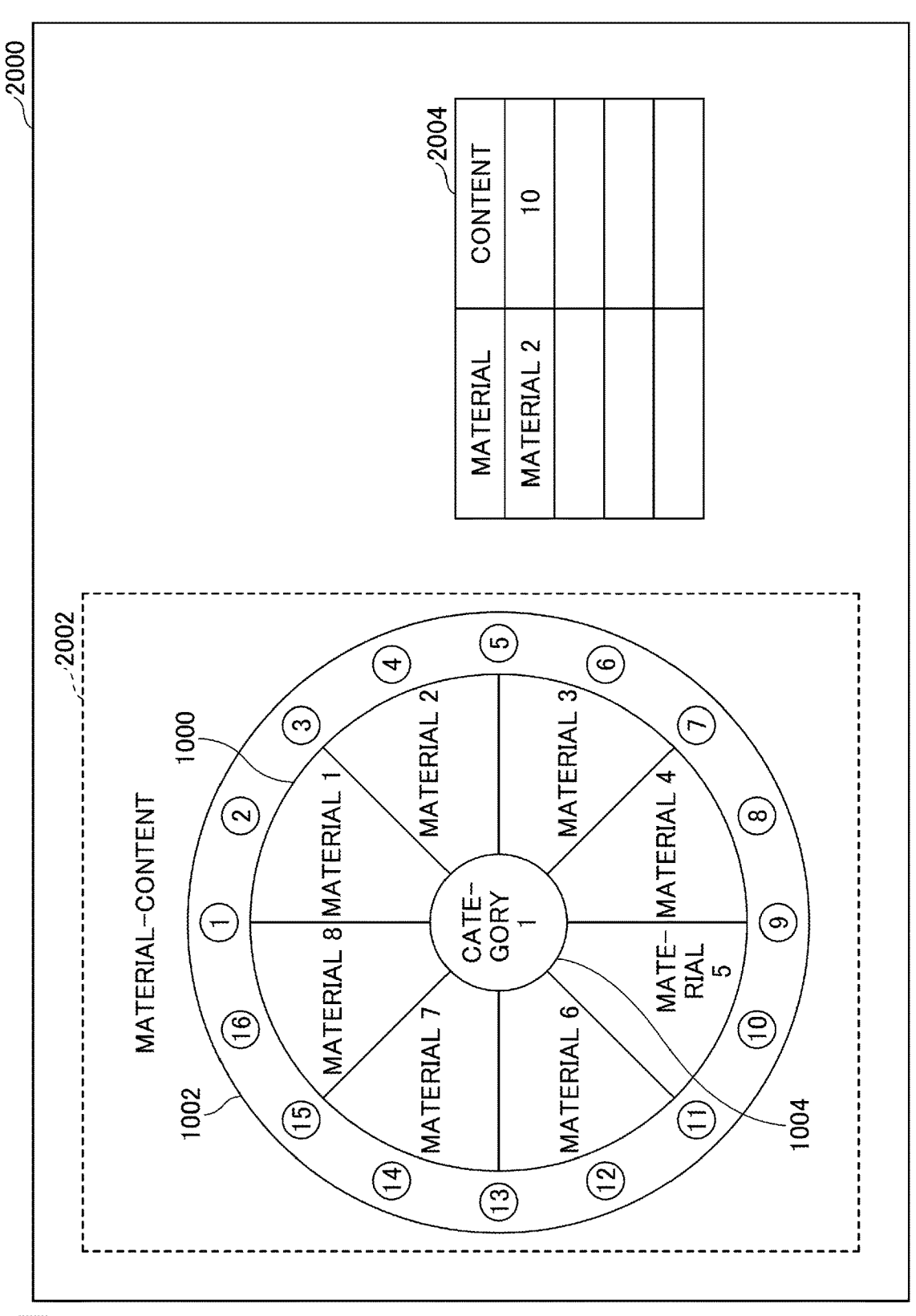
FIG. 11 is an illustration of an example of an information input screen to which the UI that supports the input of information on a material composition by an operator is applied.
Figure 12:
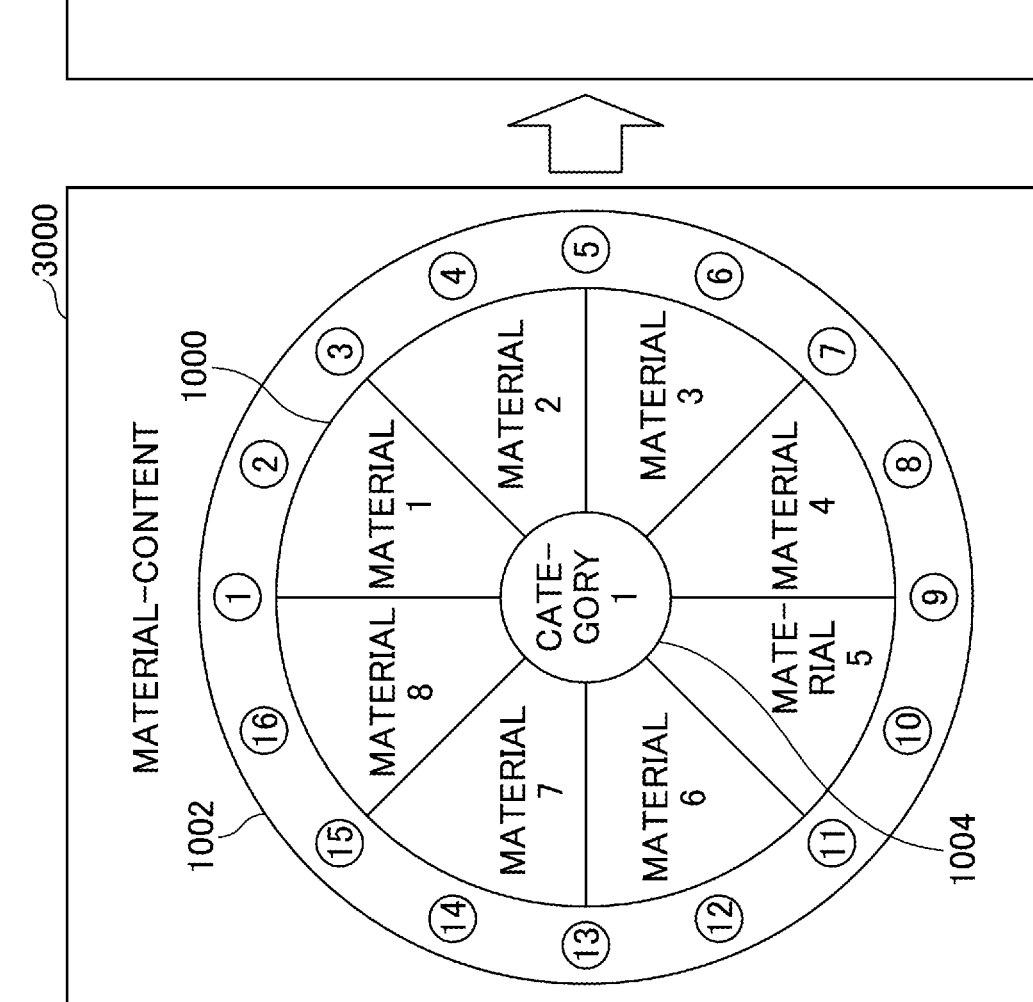
FIG. 12 is an illustration of another example of the information input screen to which the UI that supports the input of information on a material composition by an operator is applied.

The UI illustrated in FIG. 6, FIG. 7A, FIG. 7B, FIG. 8A, and FIG. 8B can be applied to an information input screen 2000 illustrated in FIG. 11 or information input screens 3000 and 3002 illustrated in FIG. 12, for example.

FIG. 11 is an illustration of an example of the information input screen to which the UI that supports the input of information on a material composition by an operator is applied. The information input screen 2000 of FIG. 11 includes a UI 2002 illustrated in FIG. 6, FIG. 7A, FIG. 7B, FIG. 8A, and FIG. 8B, and a display area 2004 for displaying information on a material composition input through the UI 2002. The operator can display information on the material compositions in the display area 2004 by repeatedly selecting the material and the content thereof through the UI 2002. The information input screen 2000 of FIG. 11 is a screen image for the user terminal 12 having a large screen size, such as a PC or a tablet terminal.

FIG. 12 is an illustration of another example of the information input screen to which the UI that supports the input of information on a material composition by an operator is applied. The information input screen 3000 of FIG. 12 displays the UI illustrated in FIG. 6, FIG. 7A, FIG. 7B, FIG. 8A, and FIG. 8B. The information input screen 3002 of FIG. 12 includes a display area 2004 for displaying information on a material composition input through the UI of FIG. 12.

The operator can display information on the material compositions in the display area 2004 of FIG. 12 by repeatedly selecting the material and the content thereof through the UI of FIG. 12 while switching between the display of the information input screen 3000 of FIG. 12 and the display of the information input screen 3002 of FIG. 12. The information input screens 3000 and 3002 of FIG. 12 are screen images for the user terminal 12 having a small screen size, such as a smartphone.

Another Embodiment

In the present embodiment, an example of a desirable shape of the UI that supports the input of information on a material composition is illustrated in FIG. 6, FIG. 7A, FIG. 7B, FIG. 8A, and FIG. 8B. The present embodiment can be applied to a UI other than the shape illustrated in FIG. 6, FIG. 7A, FIG. 7B, FIG. 8A, and FIG. 8B as long as the UI has a shape that receives selection of a material, to which input of information is directed, in accordance with the operation specifying the on-screen position performed by an operator and also receives selection of a content of the material, to which input of information is directed, in accordance with the operation stopping specifying the on-screen position performed by the operator.

As described above, the information processing system 1 according to the present embodiment can support an operator to shorten an input time of a material composition including types and contents of materials. Accordingly, the operator can shorten the input time of the material composition, and can quickly obtain a prediction result of physical properties of the composite material. The information on the material composition input by the operator using the UI of the present embodiment may also be used as input information to a manufacturing device that generates a composite material based on the information on the material composition, for example.

Although the present embodiment has been described above, it will be understood that various changes in form and detail may be made without departing from the spirit and scope of the appended claims.

Although the present disclosure has been described based on the embodiments, the present disclosure is not limited to the above-described embodiments, and various modifications can be made within the scope of the claims. This application is based upon and claims priority to Japanese Patent Application No. 2021-168567 filed on Oct. 14, 2021, the entire contents of which are incorporated herein by reference.

DESCRIPTION OF THE REFERENCE NUMERALS

1 information processing system
10 material design device
12 user terminal
18 communication network
20 information display unit
22 operation reception unit
24 request transmission unit
26 response reception unit
40 material information storage unit
42 material-content information storage unit
50 UI screen generation unit
52 material display control unit
54 material-content display control unit
60 material reception unit
62 material-content reception unit
1000 dial portion
1002 ring portion 1004 category selection reception unit
2000, 3000, 3002 information input screen
2002 UI
2004 display area

The invention claimed is:

1. An information processing apparatus for receiving input of information on a material composition from an operator, the information processing apparatus comprising:

circuitry configured to receive selection of a material, to which input of information is directed, in accordance with a first operation to specify an on-screen position, the first operation being performed on a dial portion by the operator; and receive, through a ring portion, selection of a content of the material, to which the input of information is directed, in accordance with a second operation to stop specifying the on-screen position, wherein a plurality of materials are arranged on the dial portion, wherein the ring portion is configured to display the content based on a positional relationship with the material that is displayed on the dial portion, and wherein the circuitry is configured to select the material displayed on the dial portion, as the material to which the input of information is directed, by performing the first operation to specify the on-screen position and rotating the dial portion, and select the content of the material as the content of the material to which the input of information is directed, by performing the second operation to stop specifying the on-screen position, based on the positional relationship between the material displayed on the dial portion and the content displayed on the ring portion.

2. The information processing apparatus as claimed in claim 1, wherein the circuitry is configured to display information on materials associated with respective on-screen positions on a screen such that the selection of the material, to which the input of information is directed, is received from the operator in accordance with the first operation, and display information on material contents associated with respective on-screen positions on the screen such that the selection of the content of the material is received from the operator in accordance with the second operation.

3. The information processing apparatus as claimed in claim 2, wherein the circuitry is configured to receive selection of a category of the materials, and switch the information on the materials to be displayed on the screen in accordance with the category selected by the operator.

4. The information processing apparatus as claimed in claim 2, wherein the circuitry is configured to switch the information on the material contents selected by the operator, in accordance with the material, to which the input of information is directed, selected by the operator.

5. The information processing apparatus as claimed in claim 2, wherein the circuitry is configured to display the information on the materials, to which the input of information is directed, arranged in a circumferential direction on the dial portion that rotates in accordance with an operation by the operator, receive the selection of the material, to which the input of information is directed, in accordance with the first operation on the dial portion, display the information on the material contents such that the information on the material contents are arranged in a circumferential direction on the ring portion displayed outside the dial portion, and receive the selection of the content of the material, to which the input of information is directed, by the second operation, based on the positional relationship between a position where the information on the material, to which the input of information is directed, is displayed on the dial portion and a position where the information on the material contents is displayed on the ring portion, the positional relationship being changed in accordance with a rotation distance of the dial portion in the circumferential direction.

6. The information processing apparatus as claimed in claim 1, wherein the first operation includes starting of dragging by the operator, and the second operation includes ending of the dragging.

7. An input support method executed by a computer for receiving input of information on a material composition from an operator, the method comprising:

receiving selection of a material, to which input of information is directed, in accordance with a first operation to specify an on-screen position performed on a dial portion by the operator; and receiving, through a ring portion, selection of a content of the material, to which the input of information is directed, in accordance with a second operation to stop specifying the on-screen position, wherein a plurality of materials are arranged on the dial portion, wherein the ring portion is configured to display the content based on a positional relationship with the material that is displayed on the dial portion, and wherein the input support method further includes:

selecting the material displayed on the dial portion, as the material to which the input of information is directed, by performing the first operation to specify the on-screen position and rotating the dial portion; and selecting the content of the material as the content of the material to which the input of information is directed, by performing the second operation to stop specifying the on-screen position, based on the positional relationship between the material displayed on the dial portion and the content displayed on the ring portion.

8. A non-transitory computer readable medium storing a program which causes a computer to execute the input support method of claim 7.

* * * * *